United States Patent
Chen et al.

(10) Patent No.: US 10,069,948 B2
(45) Date of Patent: Sep. 4, 2018

(54) METHOD, APPARATUS, AND SYSTEM FOR ACQUIRING MEDIA SERVICE PARAMETER INDICATION

(71) Applicant: Huawei Technologies Co., Ltd., Shenzhen (CN)

(72) Inventors: Bing Chen, Shenzhen (CN); Yu Wang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 267 days.

(21) Appl. No.: 15/153,322

(22) Filed: May 12, 2016

(65) Prior Publication Data
US 2016/0261726 A1 Sep. 8, 2016

Related U.S. Application Data

(63) Continuation of application No. PCT/CN2014/081640, filed on Jul. 4, 2014.

(30) Foreign Application Priority Data

Dec. 27, 2013 (CN) .......................... 2013 1 0740575

(51) Int. Cl.
*H04L 29/06* (2006.01)
*H04W 92/14* (2009.01)
(Continued)

(52) U.S. Cl.
CPC ............ *H04L 69/22* (2013.01); *H04L 67/147* (2013.01); *H04L 67/28* (2013.01); *H04L 67/32* (2013.01);
(Continued)

(58) Field of Classification Search
CPC ...... H04L 69/22; H04L 67/147; H04W 76/22; H04W 72/1289; H04W 92/14
See application file for complete search history.

(56) References Cited

U.S. PATENT DOCUMENTS 9,628,579 B2 * 4/2017 Li ............................. H04L 12/14
9,807,248 B2 * 10/2017 Wei .......................... H04L 47/10
(Continued)

FOREIGN PATENT DOCUMENTS

CN          1909514 A      2/2007
CN        101018199 A      8/2007
(Continued)

OTHER PUBLICATIONS

"3rd Generation Partnership Project; Technical Specification Group Services and System Aspects; System Enhancements for User Plane Congestion Management (Release 12)," 3GPP TR 23.705 V0.3.0, Apr. 2013, 18 pages.

*Primary Examiner* — Chi H Pham
*Assistant Examiner* — Weibin Huang
(74) *Attorney, Agent, or Firm* — Slater Matsil, LLP

(57) ABSTRACT

A method, an apparatus and a system for acquiring media service parameter indication are disclosed. In an embodiment the method includes acquiring, by a gateway GPRS support node (GGSN) or a packet data network gateway (PGW), a media service flow configuration parameter indication, wherein the media service flow configuration parameter indication comprises at least one of the following: a data packet sequence number, a current connection status, media information, or media play time and sending, by the GGSN or the PGW, the media service flow configuration parameter indication to a serving GPRS support node (SGSN) or a serving gateway (SGW). The method further includes sending, by the SGSN or the SGW, the media service flow configuration parameter indication to a radio access network (RAN) and acquiring, by the RAN, the media service flow configuration parameter indication.

19 Claims, 4 Drawing Sheets

(51) Int. Cl.
    *H04L 29/08*     (2006.01)
    *H04W 72/12*     (2009.01)
    *H04W 76/22*     (2018.01)
    *H04W 28/12*     (2009.01)
    *H04W 88/16*     (2009.01)

(52) U.S. Cl.
    CPC ....... *H04W 72/1289* (2013.01); *H04W 76/22* (2018.02); *H04W 92/14* (2013.01); *H04W 28/12* (2013.01); *H04W 88/16* (2013.01)

(56) References Cited

U.S. PATENT DOCUMENTS

| | | | |
|---|---|---|---|
| 2006/0159069 A1 | 7/2006 | Parekh et al. | |
| 2007/0201430 A1 | 8/2007 | Holmstrom et al. | |
| 2007/0204050 A1* | 8/2007 | Liu | H04L 47/14 709/230 |
| 2008/0101270 A1* | 5/2008 | Kekki | H04W 72/005 370/312 |
| 2010/0103814 A1* | 4/2010 | Chun | H04L 1/1893 370/225 |
| 2011/0310868 A1* | 12/2011 | Yang | H04W 68/00 370/338 |
| 2013/0301521 A1* | 11/2013 | Abdi | H04B 7/18513 370/316 |

FOREIGN PATENT DOCUMENTS

| | | |
|---|---|---|
| CN | 101120570 A | 2/2008 |
| CN | 101132545 A | 2/2008 |
| CN | 102413455 | 4/2012 |
| WO | 2011143481 A2 | 11/2011 |
| WO | 2011157460 A1 | 12/2011 |

* cited by examiner

METHOD, APPARATUS, AND SYSTEM FOR ACQUIRING MEDIA SERVICE PARAMETER INDICATION

CROSS-REFERENCE TO RELATED APPLICATIONS

This application is a continuation of International Application No. PCT/CN2014/081640, filed on Jul. 4, 2014, which claims priority to Chinese Patent Application No. 201310740575.2, filed on Dec. 27, 2013, both of which are hereby incorporated by reference in their entireties.

TECHNICAL FIELD

The present invention relates to the communications field, and in particular, to a method, an apparatus, and a system for acquiring a media service parameter indication.

BACKGROUND

Currently, a terminal user usually has poor quality of experience due to impact of factors such as a network jitter when enjoying a media service. To enhance subjective experience of the user for the media service, wireless scheduling may be performed to optimize the media service, so that a better service and a better scheduling scheme are selected for the terminal user.

A terminal status is an important input parameter in wireless scheduling. Wireless scheduling may be performed according to the terminal status. A related technology cannot be used to estimate the terminal status in a radio access network (RAN), and therefore cannot be used to provide a better service and a better scheduling scheme for the terminal user during wireless scheduling to optimize user experience for the media service.

SUMMARY

Embodiments of the present invention provide a method, an apparatus, and a system for acquiring a media service parameter indication, so that a better service and a better scheduling scheme can be selected for a terminal user to optimize user experience for a media service.

According to a first aspect, a method for acquiring a media service parameter indication is provided, where the method includes acquiring, by a gateway GPRS support node (GGSN) or a packet data network gateway (PGW), a media service flow configuration parameter indication, where the media service flow configuration parameter indication includes at least one of the following: a data packet sequence number, a current connection status, media information, and media play time; and sending, by the GGSN or the PGW, the media service flow configuration parameter indication to a radio access network (RAN).

With reference to the first aspect, in a first possible implementation manner, the sending, by the GGSN or the PGW, the media service flow configuration parameter indication to a RAN includes adding, by the GGSN or the PGW, the media service flow configuration parameter indication to a data packet that is to be sent to the RAN.

With reference to the first aspect, in a second possible implementation manner, the sending, by the GGSN or the PGW, the media service flow configuration parameter indication to a RAN includes adding, by the GGSN or the PGW, the media service flow configuration parameter indication to a data packet or control signaling that is to be sent to the RAN.

With reference to the second possible implementation manner of the first aspect, in a third possible implementation manner, the media service flow configuration parameter indication added by the GGSN or the PGW to the control signaling that is to be sent to the RAN includes at least one of the following: a current connection status and media information.

With reference to the first aspect, in a fourth possible implementation manner, the sending, by the GGSN or the PGW, the media service flow configuration parameter indication to a RAN includes adding, by the GGSN or the PGW, the media service flow configuration parameter indication to control signaling that is to be sent to the RAN, where the media service flow configuration parameter indication includes at least one of the following: a current connection status and media information.

With reference to any one of the first possible implementation manner to the third possible implementation manner of the first aspect, in a fifth possible implementation manner, the data packet is a GPRS Tunneling Protocol-User Plane (GTP-U) data packet, and the media service flow configuration parameter indication is carried in an extension header of the GTP-U data packet.

According to a second aspect, a method for acquiring a media service parameter indication is provided, where the method includes acquiring, by a RAN, a media service flow configuration parameter indication, where the media service flow configuration parameter indication includes at least one of the following: a data packet sequence number, a current connection status, media information, and media play time; and estimating, by the RAN, a terminal status according to the acquired media service flow configuration parameter indication.

With reference to the second aspect, in a first possible implementation manner, the acquiring, by a RAN, a media service flow configuration parameter indication includes receiving, by the RAN, a data packet or control signaling that carries the media service flow configuration parameter indication and acquiring, by the RAN, the media service flow configuration parameter indication according to the received data packet or control signaling.

With reference to the first possible implementation manner of the second aspect, in a second possible implementation manner, when the media service flow configuration parameter indication is carried in the control signaling, the media service flow configuration parameter indication includes at least one of the following: a current connection status and media information.

With reference to the first possible implementation manner of the second aspect, in a third possible implementation manner, when the media service flow configuration parameter indication is carried in the data packet, the data packet is a GPRS Tunnelling Protocol-User Plane (GTP-U) data packet, and the media service flow configuration parameter indication is located in an extension header of the GTP-U data packet; and the acquiring the media service flow configuration parameter indication according to the data packet includes acquiring the media service flow configuration parameter indication by parsing the extension header of the GTP-U data packet.

According to a third aspect, a method for acquiring a media service parameter indication is provided, where the method includes acquiring, by a gateway GPRS support node (GGSN) or a packet data network gateway (PGW), a media service flow configuration parameter indication, where the media service flow configuration parameter indication includes at least one of the following: a data packet sequence number, a current connection status, media information, and media play time; sending, by the GGSN or the PGW, the media service flow configuration parameter indication to a serving GPRS support node (SGSN) or a serving gateway (SGW); sending, by the SGSN or the SGW, the media service flow configuration parameter indication to a radio access network RAN; and acquiring, by the RAN, the media service flow configuration parameter indication.

With reference to the third aspect, in a first possible implementation manner, before the acquiring, by a GGSN or a PGW, a media service flow configuration parameter indication, the method further includes: performing, by a packet inspection apparatus, packet inspection on a media service data packet to acquire the media service flow configuration parameter indication; and sending, by the packet inspection apparatus, the media service flow configuration parameter indication to the GGSN or the PGW; and acquiring, by a GGSN or a PGW, a media service flow configuration parameter indication includes: receiving, by the GGSN or the PGW, the media service flow configuration parameter indication from the packet inspection apparatus.

With reference to the third aspect or the first implementation manner of the third aspect, in a second possible implementation manner, the media service flow configuration parameter indication is carried in a data packet, and the sending the media service flow configuration parameter indication includes sending a data packet that carries the media service flow configuration parameter indication.

With reference to the third aspect or the first implementation manner of the third aspect, in a third possible implementation manner, the media service flow configuration parameter indication is carried in control signaling, and the sending, by the SGSN or the SGW, the media service flow configuration parameter indication to a RAN includes: sending, by the SGSN or the SGW, control signaling that carries the media service flow configuration parameter indication to a mobility management entity (MME); and sending, by the MME, the control signaling to the RAN.

With reference to the third aspect or the first implementation manner of the third aspect, in a fourth possible implementation manner, the media service flow configuration parameter indication is carried in a data packet and control signaling; sending, by the GGSN or the PGW, the media service flow configuration parameter indication to an SGSN or an SGW includes: adding, by the GGSN or the PGW, the media service flow configuration parameter indication to a data packet and control signaling that are to be sent to the SGSN or the SGW; and sending, by the SGSN or the SGW, the media service flow configuration parameter indication to a RAN includes: adding, by the SGSN or the SGW, the media service flow configuration parameter indication to a data packet that is to be sent to the RAN; or sending, by the SGSN or the SGW, control signaling that carries the media service flow configuration parameter indication to an MME; and sending, by the MME, the control signaling to the RAN.

With reference to the second implementation manner of the third aspect or the fourth implementation manner of the third aspect, in a fifth possible implementation manner, when the media service flow configuration parameter indication is carried in the data packet, the data packet is a GPRS Tunneling Protocol-User Plane (GTP-U) data packet, and the media service flow configuration parameter indication is located in an extension header of the GTP-U data packet.

According to a fourth aspect, an apparatus for acquiring a media service parameter indication is provided, where the apparatus includes: an acquiring module, configured to acquire a media service flow configuration parameter indication, where the media service flow configuration parameter indication includes at least one of the following: a data packet sequence number, a current connection status, media information, and media play time; and a sending module, configured to send the media service flow configuration parameter indication acquired by the acquiring module to a radio access network RAN.

With reference to the fourth aspect, in a first possible implementation manner, the sending module is configured to add the media service flow configuration parameter indication to a data packet that is to be sent to the RAN.

With reference to the fourth aspect, in a second possible implementation manner, the sending module is configured to add the media service flow configuration parameter indication to a data packet and control signaling that are to be sent to the RAN.

With reference to the second possible implementation manner of the fourth aspect, in a third possible implementation manner, the media service flow configuration parameter indication carried in the control signaling that is to be sent to the RAN includes at least one of the following: a current connection status and media information.

With reference to the fourth aspect, in a fourth possible implementation manner, the sending the media service flow configuration parameter indication to a RAN includes adding the media service flow configuration parameter indication to control signaling that is to be sent to the RAN, where the media service flow configuration parameter indication includes at least one of the following: a current connection status and media information.

With reference to any one of the first possible implementation manner to the third possible implementation manner of the fourth aspect, in a fifth possible implementation manner, the data packet is a GPRS Tunneling Protocol-User Plane (GTP-U) data packet, and the media service flow configuration parameter indication is carried in an extension header of the GTP-U data packet.

According to a fifth aspect, a radio access network apparatus is provided, where the apparatus includes: an acquiring module, configured to acquire a media service flow configuration parameter indication, where the media service flow configuration parameter indication includes at least one of the following: a data packet sequence number, a current connection status, media information, and media play time; and a processing module, configured to estimate a terminal status according to the media service flow configuration parameter indication acquired by the acquiring module.

With reference to the fifth aspect, in a first possible implementation manner, the acquiring module is configured to receive a data packet or control signaling that carries the media service flow configuration parameter indication; and acquire the media service flow configuration parameter indication according to the received data packet or control signaling.

With reference to the first possible implementation manner of the fifth aspect, in a second possible implementation manner, when the media service flow configuration parameter indication is carried in the control signaling, the media service flow configuration parameter indication includes at least one of the following: a current connection status and media information.

With reference to the first possible implementation manner of the fifth aspect, in a third possible implementation manner, when the media service flow configuration parameter indication is carried in the data packet, the data packet is a GPRS Tunnelling Protocol-User Plane (GTP-U) data packet, and the media service flow configuration parameter indication is located in an extension header of the GTP-U data packet; and the acquiring module is configured to acquire the media service flow configuration parameter indication by parsing the extension header of the GTP-U data packet.

According to a sixth aspect, a system for acquiring a media service parameter indication is provided, where the system includes a GGSN or a PGW, an SGSN or an SGW, and a radio access network RAN, where the GGSN or the PGW is configured to acquire a media service flow configuration parameter indication, where the media service flow configuration parameter indication includes at least one of the following: a data packet sequence number, a current connection status, media information, and media play time; where the GGSN or the PGW is further configured to send the media service flow configuration parameter indication to the SGSN or the SGW; where the SGSN or the SGW is configured to: acquire the media service flow configuration parameter indication sent by the GGSN or the PGW, and send the media service flow configuration parameter indication to the RAN; and where the RAN is configured to acquire the media service flow configuration parameter indication.

With reference to the sixth aspect, in a first possible implementation manner, the system further includes a packet inspection apparatus, where the packet inspection apparatus is configured to: before the GGSN or the PGW acquires the media service flow configuration parameter indication, perform packet inspection on a media service data packet to acquire the media service flow configuration parameter indication; where the packet inspection apparatus is further configured to send the media service flow configuration parameter indication to the GGSN or the PGW; and where the GGSN or the PGW is configured to receive the media service flow configuration parameter indication from the packet inspection apparatus.

With reference to the sixth aspect or the first implementation manner of the sixth aspect, in a second possible implementation manner, the media service flow configuration parameter indication is carried in a data packet; the GGSN or the PGW is configured to send a data packet that carries the media service flow configuration parameter indication to the SGSN or the SGW; and the SGSN or the SGW is configured to send a data packet that carries the media service flow configuration parameter indication to the RAN.

With reference to the sixth aspect or the first implementation manner of the sixth aspect, in a third possible implementation manner, the media service flow configuration parameter indication is carried in control signaling, and the SGSN or the SGW is configured to send control signaling that carries the media service flow configuration parameter indication to a mobility management entity MME, so that the MME sends the control signaling to the RAN.

With reference to the sixth aspect or the first implementation manner of the sixth aspect, in a fourth possible implementation manner, the media service flow configuration parameter indication is carried in a data packet and control signaling; the GGSN or the PGW is configured to add the media service flow configuration parameter indication to a data packet and control signaling that are to be sent to the SGSN or the SGW; and the SGSN or the SGW is configured to: add the media service flow configuration parameter indication to a data packet that is to be sent to the RAN; or send control signaling that carries the media service flow configuration parameter indication to an MME, so that the MME sends the control signaling to the RAN.

With reference to the second implementation manner of the sixth aspect or the fourth implementation manner of the sixth aspect, in a fifth possible implementation manner, when the media service flow configuration parameter indication is carried in the data packet, the data packet is a GPRS Tunneling Protocol-User Plane (GTP-U) data packet, and the media service flow configuration parameter indication is located in an extension header of the GTP-U data packet.

After the foregoing technical solutions are used, according to the method, apparatus, and system for acquiring a media service parameter indication that are provided in the embodiments of the present invention, a media service flow configuration parameter indication is acquired, where the media service flow configuration parameter indication includes at least one of the following: a data packet sequence number, a current connection status, media information, and media play time; and the acquired media service flow configuration parameter indication is sent to a RAN, so that the RAN can estimate a terminal status according to the media service flow configuration parameter indication, and perform wireless scheduling according to the terminal status to select a better service and a better scheduling scheme for a terminal user, so as to finally achieve an effect of optimizing experience for a media service.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DETAILED DESCRIPTION OF ILLUSTRATIVE EMBODIMENTS

Figure 1:
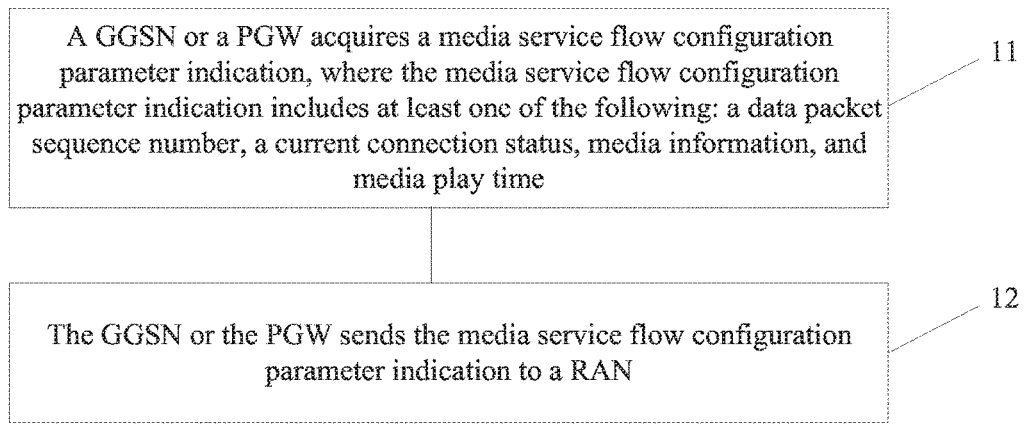
FIG. 1 is a flowchart of a method for acquiring a media service parameter indication according to an embodiment of the present invention.

FIG. 1 is a flowchart of a method for acquiring a media service parameter indication according to an embodiment of the present invention. Referring to FIG. 1, the method for acquiring a media service parameter indication provided in this embodiment of the present invention includes:

11. A GGSN or a PGW acquires a media service flow configuration parameter indication, where the media service flow configuration parameter indication includes at least one of the following: a data packet sequence number, a current connection status, media information, and media play time.

The data packet sequence number indicates a sequence of a data packet. The data packet sequence number may be a serial number of a Transmission Control Protocol (TCP) packet, or may be a serial number of a Real-time Transport Protocol (TCFP) packet.

The current connection status indicates whether a new media service or an existing media service is currently connected. If an existing media service is connected, the existing media service is identified. The connection may be a TCP connection or a User Datagram Protocol (UDP) connection.

The media information includes one of the following information: audio and video bit rates, frame rates, resolutions, coding modes, and the like. When the media information dynamically changes, the corresponding media information needs to be updated.

The media play time indicates continuous play time of a media file in the current data packet, and may be obtained according to a decoding time stamp (DTS) or a presentation time stamp (PTS) of the media file included in the data packet.

12. The GGSN or the PGW sends the media service flow configuration parameter indication to a RAN.

After receiving the media service flow configuration parameter indication, the RAN may estimate a terminal status according to the media service flow configuration parameter indication, and performs wireless scheduling according to the terminal status to select a better service and a better scheduling scheme for a terminal user, thereby enhancing experience for a media service.

In the method for acquiring a media service parameter indication provided in this embodiment of the present invention, a media service flow configuration parameter indication is acquired, where the media service flow configuration parameter indication includes at least one of the following: a data packet sequence number, a current connection status, media information, and media play time; and the acquired media service flow configuration parameter indication is sent to a RAN, so that the RAN can estimate a terminal status according to the media service flow configuration parameter indication, and perform wireless scheduling according to the terminal status to select a better service and a better scheduling scheme for a terminal user, so as to finally achieve an effect of optimizing experience for a media service.

It should be noted that an execution entity (a GGSN or a PGW) of the method for acquiring a media service parameter indication provided in this embodiment of the present invention may have a packet inspection function or may not have a packet inspection function, which is not limited in the present invention.

Because the media service flow configuration parameter indication may be carried in a media service data packet, in this embodiment of the present invention, packet inspection may be performed on the media service data packet by using a packet inspection apparatus to acquire the media service flow configuration parameter indication. In this case, when the execution entity of the method for acquiring a media service parameter indication provided in this embodiment of the present invention has the packet inspection function (that is, the packet inspection apparatus is integrated into the GGSN or the PGW), the acquiring, by a GGSN or a PGW, a media service flow configuration parameter indication in step 11 may be: performing, by the GGSN or the PGW, packet inspection on the media service data packet, and directly acquiring the media service flow configuration parameter indication by means of packet inspection. When the execution entity of the method for acquiring a media service parameter indication provided in this embodiment of the present invention does not have the packet inspection function, the acquiring, by a GGSN or a PGW, a media service flow configuration parameter indication in step 11 may be: receiving, by the GGSN or the PGW, the media service flow configuration parameter indication sent by the packet inspection apparatus, where the media service flow configuration parameter indication is acquired by the packet inspection apparatus by performing packet inspection on the media service data packet.

In this embodiment of the present invention, the media service flow configuration parameter indication may be transmitted to the RAN by using a data plane and/or a control plane, which is separately described in the following.

In an embodiment of the present invention, if the media service flow configuration parameter indication is transmitted to the RAN by using only the data plane, the sending the media service flow configuration parameter indication to a RAN in step 12 may include: adding the media service flow configuration parameter indication to a data packet that is to be sent to the RAN. The data packet may be a GPRS Tunneling Protocol-User Plane (GTP-U) data packet. The media service flow configuration parameter indication may be carried in an extension header of the GTP-U data packet, and more, the media service flow configuration parameter indication may be located at a reserved extension bit in the extension header of the GTP-U data packet.

In another embodiment of the present invention, when the media service flow configuration parameter indication is transmitted to the RAN by using the data plane and the control plane, the sending the media service flow configuration parameter indication to the RAN in step 12 may include: adding the media service flow configuration parameter indication to a data packet and control signaling that are to be sent to the RAN.

In still another embodiment of the present invention, when the media service flow configuration parameter indication is transmitted to the RAN by using only the control plane, the sending the media service flow configuration parameter indication to the RAN in step 12 may include: adding the media service flow configuration parameter indication to control signaling that is to be sent to the RAN, where the media service flow configuration parameter indication includes at least one of the following: a current connection status and media information.

It should be noted that, when the media service flow configuration parameter indication is transmitted to the RAN by using the control plane, the media service flow configuration parameter indication carried in the control signaling that is to be sent to the RAN includes at least one of the following: a current connection status and media information; when the media service flow configuration parameter indication is transmitted to the RAN by using the data plane, the media service flow configuration parameter indication carried in the data packet that is to be sent to the RAN may include at least one of the following: a data packet sequence number, a current connection status, media information, and media play time.

Figure 2:
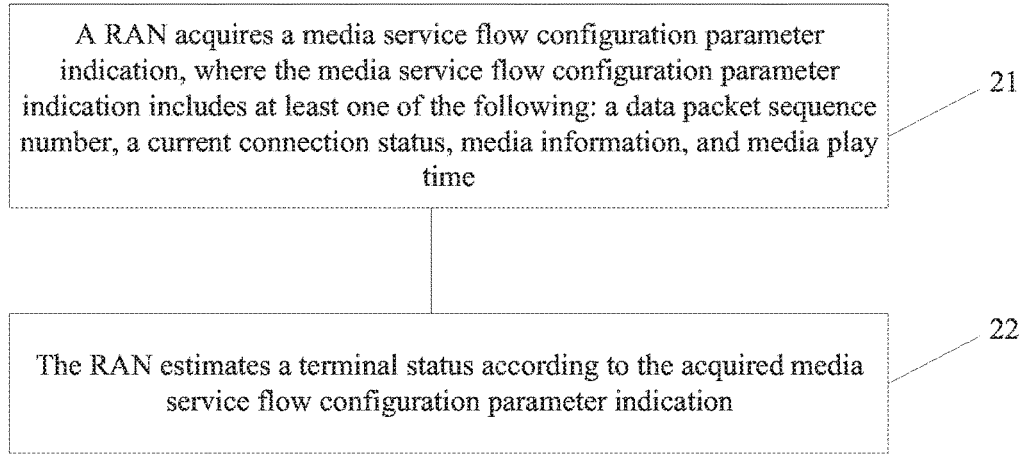
FIG. 2 is a flowchart of a method for acquiring a media service parameter indication according to an embodiment of the present invention.

FIG. 2 is a flowchart of a method for acquiring a media service parameter indication according to an embodiment of the present invention. Referring to FIG. 2, the method for acquiring a media service parameter indication provided in this embodiment of the present invention includes:

21. A RAN acquires a media service flow configuration parameter indication, where the media service flow configuration parameter indication includes at least one of the following: a data packet sequence number, a current connection status, media information, and media play time.

22. The RAN estimates a terminal status according to the acquired media service flow configuration parameter indication.

In the method for acquiring a media service parameter indication provided in this embodiment of the present invention, a media service flow configuration parameter indication is acquired, where the media service flow configuration parameter indication includes at least one of the following: a data packet sequence number, a current connection status, media information, and media play time; a terminal status is estimated according to the media service flow configuration parameter indication; and wireless scheduling is performed according to the terminal status to select a better service and a better scheduling scheme for a terminal user, so as to finally achieve an effect of optimizing experience for a media service.

In this embodiment of the present invention, the acquiring, by a RAN, a media service flow configuration parameter indication in step 21 may include: receiving, by the RAN, a data packet and/or control signaling that carry/carries the media service flow configuration parameter indication; and acquiring, by the RAN, the media service flow configuration parameter indication according to the received data packet and/or control signaling. In this embodiment of the present invention, the media service flow configuration parameter indication may be carried in only the data packet, or may be carried in only the control signaling, or certainly may be carried in both the data packet and the control signaling. That is, the media service flow configuration parameter indication may be acquired by receiving the data packet that carries the media service flow configuration parameter indication, or the media service flow configuration parameter indication may be acquired by receiving the control signaling that carries the media service flow configuration parameter indication, or certainly the media service flow configuration parameter indication may be acquired by receiving the data packet that carries the media service flow configuration parameter indication and the control signaling that carries the media service flow configuration parameter indication.

When the media service flow configuration parameter indication is carried in the control signaling, the media service flow configuration parameter indication carried in the control signaling includes at least one of the following: a current connection status and media information. When the media service flow configuration parameter indication is carried in the data packet, the media service flow configuration parameter indication carried in the data packet may include at least one of the following: a data packet sequence number, a current connection status, media information, and media play time.

In addition, in this embodiment of the present invention, when the media service flow configuration parameter indication is carried in the data packet, the data packet may be a GTP-U data packet, the media service flow configuration parameter indication may be located in an extension header of the GTP-U data packet, and more, the media service flow configuration parameter indication may be located at a reserved extension bit in the extension header of the GTP-U data packet. In this case, the acquiring the media service flow configuration parameter indication according to the data packet may be: acquiring the media service flow configuration parameter indication by parsing the extension header of the GTP-U data packet.

Figure 3:
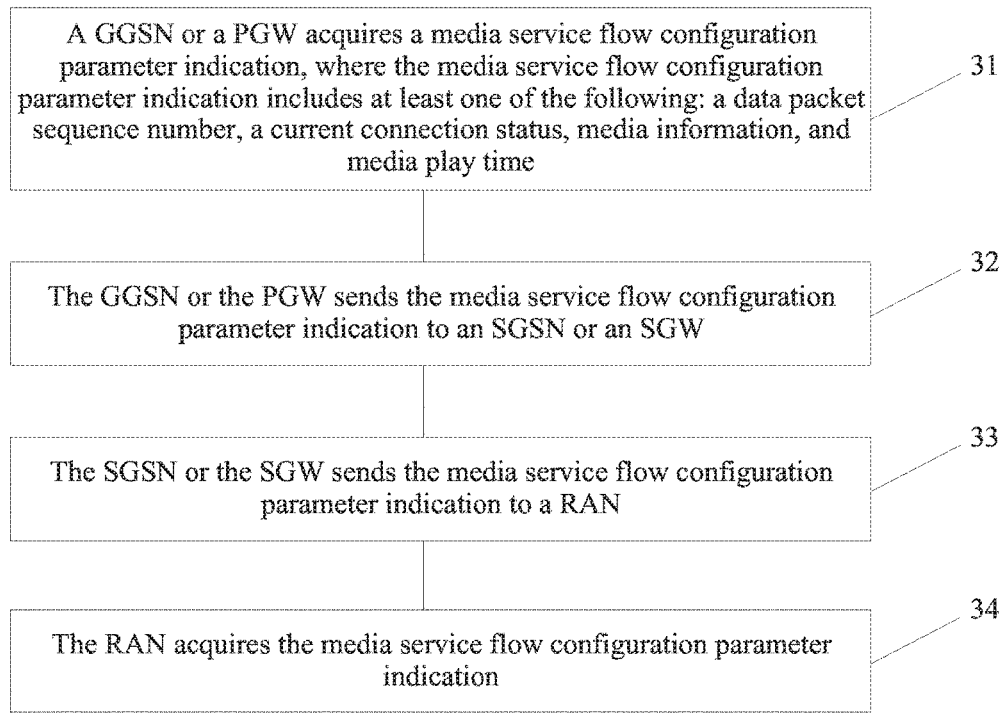
FIG. 3 is a flowchart of a method for acquiring a media service parameter indication according to an embodiment of the present invention.

FIG. 3 is a flowchart of a method for acquiring a media service parameter indication according to an embodiment of the present invention. Referring to FIG. 3, the method for acquiring a media service parameter indication provided in this embodiment of the present invention includes:

31. A gateway GPRS support node (GGSN) or a packet data network gateway (PGW) acquires a media service flow configuration parameter indication, where the media service flow configuration parameter indication includes at least one of the following: a data packet sequence number, a current connection status, media information, and media play time.

32. The GGSN or the PGW sends the media service flow configuration parameter indication to a serving GPRS support node (SGSN) or a serving gateway (SGW).

33. The SGSN or the SGW sends the media service flow configuration parameter indication to a RAN.

34. The RAN acquires the media service flow configuration parameter indication.

In the method for acquiring a media service parameter indication provided in this embodiment of the present invention, a media service flow configuration parameter indication is acquired, where the media service flow configuration parameter indication includes at least one of the following: a data packet sequence number, a current connection status, media information, and media play time; and the acquired media service flow configuration parameter indication is sent to a RAN, so that the RAN can estimate a terminal status according to the media service flow configuration parameter indication, and perform wireless scheduling according to the terminal status to select a better service and a better scheduling scheme for a terminal user, so as to finally achieve an effect of optimizing experience for a media service.

Because the media service flow configuration parameter indication may be carried in a media service data packet, in this embodiment of the present invention, packet inspection may be performed on the media service data packet by using a packet inspection apparatus to acquire the media service flow configuration parameter indication. In this case, in an embodiment of the present invention, when the GGSN or the PGW has a packet inspection function, the acquiring a media service flow configuration parameter indication in step 31 may be: performing packet inspection on a media service data packet, and directly acquiring the media service flow configuration parameter indication by means of packet inspection.

When the GGSN or the PGW does not have the packet inspection function, in an embodiment of the present invention, before the acquiring, by the GGSN or the PGW, a media service flow configuration parameter indication in step 31, the method may further include: performing, by the packet inspection apparatus, packet inspection on the media service data packet to acquire the media service flow configuration parameter indication; and sending, by the packet inspection apparatus, the service flow configuration parameter indication to the GGSN or the PGW.

In this case, the acquiring, by a GGSN or a PGW, a media service flow configuration parameter indication in step 31 may include: receiving, by the GGSN or the PGW, the media service flow configuration parameter indication from the packet inspection apparatus.

It should be noted that, the media service flow configuration parameter indication in this embodiment of the present invention may be carried in a data packet and/or control signaling, which is separately described in the following.

In an embodiment of the present invention, the media service flow configuration parameter indication may be carried in a data packet. In this case, the sending the media service flow configuration parameter indication in step 32 and step 33 may include: sending the data packet that carries the media service flow configuration parameter indication.

In another embodiment of the present invention, the media service flow configuration parameter indication may be carried in control signaling. In this case, the sending, by the SGSN or the SGW, the media service flow configuration parameter indication to a RAN in step 33 may be: sending, by the SGSN or the SGW, the media service flow configuration parameter indication to a mobility management entity (MME), and sending, by the MME, the media service flow configuration parameter indication to the RAN.

In still another embodiment of the present invention, the media service flow configuration parameter indication may be carried in both a data packet and control signaling. The media service flow configuration parameter indication carried in the control signaling includes at least one of the following: a current connection status and media information. When the media service flow configuration parameter indication is carried in the data packet, the media service flow configuration parameter indication carried in the data packet may include at least one of the following: a data packet sequence number, a current connection status, media information, and media play time.

In a case the media service flow configuration parameter indication is carried in both the data packet and the control signaling, the sending, by the GGSN or the PGW, the media service flow configuration parameter indication to an SGSN or an SGW in step 32 may include: adding, by the GGSN or the PGW, the media service flow configuration parameter indication to a data packet and control signaling that are to be sent to the SGSN or the SGW.

In this case, the sending, by the SGSN or the SGW, the media service flow configuration parameter indication to a RAN in step 33 may include:

adding, by the GGSN or the PGW, the media service flow configuration parameter indication to a data packet that is to be sent to the SGSN or the SGW; or sending, by the SGSN or the SGW, the media service flow configuration parameter indication to an MME; and sending, by the MME, the media service flow configuration parameter indication to the RAN.

In other words, when the SGSN or the SGW sends the media service flow configuration parameter indication to the RAN, different manners are used according to whether the data packet that carries the media service flow configuration parameter indication is transmitted or the control signaling that carries the media service flow configuration parameter indication is transmitted. When the data packet that carries the media service flow configuration parameter indication is transmitted, the SGSN or the SGW directly sends the data packet that carries the media service flow configuration parameter indication to the RAN; when the control signaling that carries the media service flow configuration parameter indication is transmitted, the SGSN or the SGW sends the control signaling to the MME first, and then the MME sends the control signaling to the RAN.

It should be noted that, "sending B to A" mentioned in this specification is used to indicate that a destination to which B is to be sent is A, "to A" is used only to indicate a sending direction, which indicates that B may be sent directly to A, or may be sent to A via an intermediate device.

In this embodiment of the present invention, when the media service flow configuration parameter indication is carried in the data packet, the data packet may be a GTP-U data packet, and the media service flow configuration parameter indication may be located in an extension header of the GTP-U data packet. More, the media service flow configuration parameter indication may be located at a reserved extension bit in the extension header of the GTP-U data packet. In this case, the acquiring, by the RAN, the media service flow configuration parameter indication may be: acquiring, by the RAN, the media service flow configuration parameter indication by parsing the extension header of the GTP-U data packet.

To better understand the present application, a specific embodiment is used as an example below to further elaborate the present application.

An embodiment of the present invention provides a method for acquiring a media service parameter indication. In this embodiment, a RAN acquires a terminal status estimation parameter, that is, a media service flow configuration parameter indication, by using a data plane.

The method for acquiring a media service parameter indication provided in this embodiment may include:

1. A packet inspection apparatus performs packet inspection on a data packet to obtain a media service flow configuration parameter indication, where the media service flow configuration parameter indication may include at least one of a data packet sequence number, a current connection status, media information, media play time, or the like.

2. A GGSN/PGW acquires the media service flow configuration parameter indication, and adds the media service flow configuration parameter indication to a user-plane data packet, which is to be sent to an SGSN/SGW, of each media service.

a) When a media service is a newly established connection, the current connection status is that a new media service is connected.

b) When the media service is a reestablished connection, the current connection status is that an existing media service is connected, and the existing media service is identified.

c) When the media information dynamically changes, the corresponding media information is updated.

3. The SGSN or SGW sends the user-plane data packet that includes the media service flow configuration parameter indication to a RAN.

4. The RAN obtains the media service flow configuration parameter indication.

The media service flow configuration parameter indication may be transmitted in user-plane data by redefining an extension header of GTP-U data packet.

In the method for acquiring a media service parameter indication provided in this embodiment of the present invention, a media service flow configuration parameter indication is acquired, where the media service flow configuration parameter indication includes at least one of the following: a data packet sequence number, a current connection status, media information, and media play time; and the acquired media service flow configuration parameter indication is sent to a RAN, so that the RAN can estimate a terminal status according to the media service flow configuration parameter indication, and perform wireless scheduling according to the terminal status to select a better service and a better scheduling scheme for a terminal user, so as to finally achieve an effect of optimizing experience for a media service.

Another embodiment of the present invention provides a method for acquiring a media service parameter indication. In this embodiment, a RAN acquires a terminal status estimation parameter, that is, a media service flow configuration parameter indication, by using a data plane and a control plane.

The method for acquiring a media service parameter indication provided in this embodiment may include:

1. A packet inspection apparatus performs packet inspection on a data packet to obtain a media service flow configuration parameter indication, where the media service flow configuration parameter indication may include at least one of a data packet sequence number, a current connection status, media information, media play time, or the like.

2. A GGSN/PGW acquires the media service flow configuration parameter indication, and for a newly established media service, the GGSN or PGW sends a message to an SGSN or SGW, where the message carries a media service flow configuration parameter indication that includes at least one of a current connection status that is a new media service, or media information.

3. The SGSN or SGW sends a message to an MME, where the message carries the media service flow configuration parameter indication in step 2.

4. The MME sends a message to a RAN, where the message carries the media service flow configuration parameter indication in step 3.

5. The GGSN or PGW adds a media service flow configuration parameter indication that includes at least one of a data packet sequence number or media play time to a user-plane data packet, which is to be sent to the SGSN or SGW, of each media service, where the media service flow configuration parameter indication may be transmitted in user-plane data by using an extension header of GTP-U data packet.

6. The SGSN or SGW sends, to the RAN, the user-plane data that carries the media service flow configuration parameter indication mentioned in step 5.

7. The RAN obtains all the media service flow configuration parameter indications. That the RAN obtains all the media service flow configuration parameter indications refers to that the RAN may obtain the media service flow configuration parameter indication (including at least one of a current connection status that is a new media service, or media information) mentioned in step 4 and the media service flow configuration parameter indication (including at least one of a data packet sequence number or media play time) mentioned in step 6.

It should be noted that, in a scenario in which a cell handover occurs for UE, the RAN in steps 1 to 7 in this embodiment is a source RAN. In this case, the following process further needs to be performed:

a) When the source RAN detects that a cell handover occurs for UE, the source RAN sends, to a target RAN, the media service flow configuration parameter indication, including at least one of a data packet sequence number, a current connection status, media information, media play time, or the like.

b) The target RAN acquires the media service flow configuration parameter indication.

It should be noted that, the steps in this embodiment may not necessarily be performed in sequence. For example, steps 2 to 4 and steps 5 and 6 may be performed concurrently as two independent branches, that is, step 2 and step 5 may be performed at the same time.

"Messages" mentioned in steps 2 to 4 in this embodiment may not be a same message. In addition, according to different systems used, the messages mentioned in steps 2 to 4 in this embodiment may also change. In a Long Term Evolution (Long Term Evolution, LTE) system, information sent by a GGSN/PGW to an SGSN or SGW may be a Create Bearer Request (Create Bearer Request), information sent by the SGSN or SGW to an MME may be a Create Bearer Request, and information sent by the MME to a RAN may be a Bearer Setup Request or Session Management Request.

The method provided in this embodiment may be applicable to a progressive download scenario in which no connection is reestablished and media information does not change dynamically.

In the method for acquiring a media service parameter indication provided in this embodiment of the present invention, a media service flow configuration parameter indication is acquired, where the media service flow configuration parameter indication includes at least one of the following: a data packet sequence number, a current connection status, media information, and media play time; and the acquired media service flow configuration parameter indication is sent to a RAN, so that the RAN can estimate a terminal status according to the media service flow configuration parameter indication, and perform wireless scheduling according to the terminal status to select a better service or a better scheduling scheme for a terminal user, so as to finally achieve an effect of optimizing experience for a media service.

Still another embodiment of the present invention provides a method for acquiring a media service parameter indication. In this embodiment, a RAN also acquires a terminal status estimation parameter, that is, a media service flow configuration parameter indication, by using a data plane and a control plane.

The method for acquiring a media service parameter indication provided in this embodiment may include:

1. A packet inspection apparatus performs packet inspection on a data packet to obtain a media service flow configuration parameter indication, where the media service flow configuration parameter indication may include at least one of a data packet sequence number, a current connection status, media information, media play time, or the like.

2. A GGSN or PGW acquires the media service flow configuration parameter indication, and for a newly established media service, the GGSN or PGW sends a message to an SGSN or SGW, where the message carries a media service flow configuration parameter indication that includes at least one of a current connection status that is a new media service, or media information.

3. The SGSN or SGW sends a message to an MME, where the message carries the media service flow configuration parameter indication in step 2.

4. The MME sends a message to a RAN, where the message carries the media service flow configuration parameter indication in step 3.

5. When a media service switchover occurs, perform the following steps (a) to (c):

a) The GGSN/PGW sends a message to the SGSN or SGW. The details are as follows:

i. When a connection is reestablished for a media service, the GGSN or PGW sends a message to the SGSN or SGW, where the message carries a media service flow configuration parameter indication, including that a current connection status is that an existing media service is connected, and the existing media service is identified.

ii. When media information dynamically changes, the GGSN or PGW sends a message to the SGSN or SGW, where the message includes a media service flow configuration parameter indication of updated media information.

b) The SGSN or SGW sends a message to an MME, including the media service flow configuration parameter indication mentioned in step (a).

c) The MME sends a message to a RAN, including the media service flow configuration parameter indication in step (b).

6. The GGSN or PGW adds a media service flow configuration parameter indication that includes at least one of a data packet sequence number or media play time to a user-plane data packet, which is to be sent to the SGSN or SGW, of each media service, where the media service flow configuration parameter indication may be transmitted in user-plane data by using an extension header of GTP-U data packet.

7. The SGSN or SGW sends, to the RAN, the user-plane data that carries the media service flow configuration parameter indication mentioned in step 6.

8. The RAN obtains all the media service flow configuration parameter indications, and acquires a media service parameter according to the obtained media service flow configuration parameter indications. That the RAN obtains all the media service flow configuration parameter indications refers to that the RAN may obtain the media service flow configuration parameter indication (including at least one of a current connection status or media information) mentioned in step 4 or 5 and the media service flow configuration parameter indication (including at least one of a data packet sequence number or media information) mentioned in step 7.

It should be noted that, in a scenario in which a cell handover occurs for UE, the RAN in steps 1 to 8 in this embodiment is a source RAN. In this case, the following process further needs to be performed:

a) When the source RAN detects that a cell handover occurs for UE, the source RAN sends, to a target RAN, the media service flow configuration parameter indication, including at least one of a data packet sequence number, a current connection status, media information, media play time, or the like.

b) The target RAN acquires the media service flow configuration parameter indication.

It should be noted that, steps in this embodiment may not necessarily be performed in sequence. For example, steps 2 to 4 and steps 6 and 7 may be performed concurrently as two independent branches. For another example, step 5 and steps 6 and 7 may also be performed concurrently as two independent branches. That is, step 2 and step 6 may be performed at the same time, and step 5(a) and step 6 may also be performed at the same time.

"Messages" mentioned in steps in this embodiment may not be a same message. According to different systems used, the messages mentioned in steps in this embodiment may also change. In an LTE system, information sent by a GGSN or PGW to an SGSN or SGW may be a Create Bearer Request, information sent by the SGSN or SGW to an MME may be a Create Bearer Request, and information sent by the MME to a RAN may be a Bearer Setup Request or Session Management Request.

When a media service switchover occurs, information sent by the GGSN or PGW to the SGSN/SGW may be an Update Bearer Request, information sent by the SGSN or SGW to the MME may be an Update Bearer Request, and information sent by the MME to the RAN may be a Bearer Modify Request or Session Management Request.

The method provided in this embodiment is applicable to a scenario in which a connection is reestablished and media information dynamically changes, and also applicable to a Dynamic Adaptive Streaming over HTTP (DASH) scenario.

In the DASH scenario, a bit rate, a frame rate, and a resolution of a media service change dynamically. All these factors affect quality of experience (QoE) of a terminal user. In the method for acquiring a media service parameter indication provided in this embodiment of the present invention, a media service flow configuration parameter indication is acquired, and when a media service switchover occurs, the media service flow configuration parameter indication is dynamically updated and the updated media service flow configuration parameter indication is sent to a RAN, so that the RAN can estimate a terminal status according to the updated media service flow configuration parameter indication, and perform wireless scheduling according to the terminal status to select a better service or a better scheduling scheme for a terminal user, so as to finally achieve an effect of optimizing experience for a media service.

Figure 4:
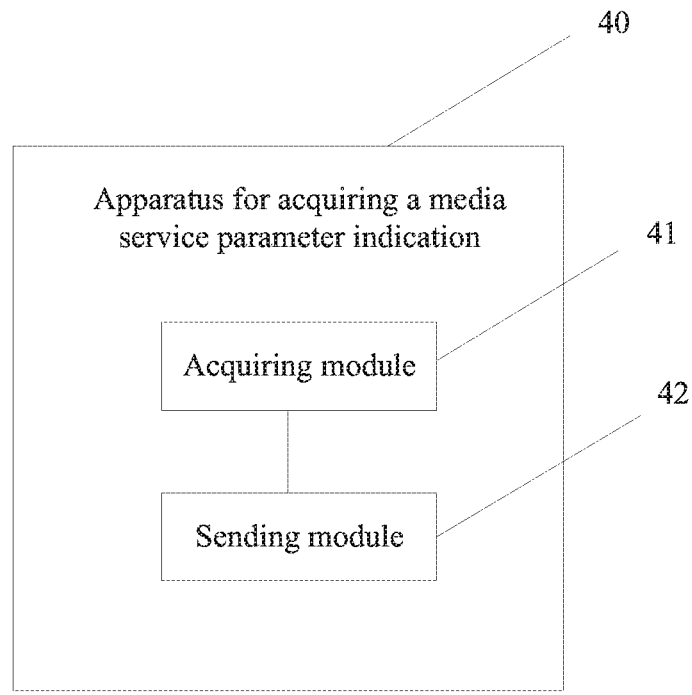
FIG. 4 is a structural block diagram of an apparatus for acquiring a media service parameter indication according to an embodiment of the present invention.

Accordingly, an embodiment of the present invention further provides an apparatus for acquiring a media service parameter indication. Referring to FIG. 4, FIG. 4 is a structural block diagram of an apparatus 40 for acquiring a media service parameter indication according to an embodiment of the present invention. The apparatus 40 includes:

an acquiring module 41, configured to acquire a media service flow configuration parameter indication, where the media service flow configuration parameter indication includes at least one of the following: a data packet sequence number, a current connection status, media information, and media play time; and a sending module 42, configured to send the media service flow configuration parameter indication acquired by the acquiring module to a radio access network RAN.

In an embodiment, the sending module 42 may be configured to:

add the media service flow configuration parameter indication to a data packet that is to be sent to the RAN.

In another embodiment, the sending module 42 may be configured to:

add the media service flow configuration parameter indication to a data packet and control signaling that are to be sent to the RAN, where the media service flow configuration parameter indication carried in the control signaling that is to be sent to the RAN may include at least one of the following: a current connection status and media information.

In still another embodiment, the sending module 42 may be configured to:

add the media service flow configuration parameter indication to control signaling that is to be sent to the RAN, where the media service flow configuration parameter indication includes at least one of the following: a current connection status and media information.

In the foregoing embodiments, the data packet may be a GTP-U data packet, and the media service flow configuration parameter indication may be carried in an extension header of the GTP-U data packet.

The apparatus for acquiring a media service parameter indication provided in this embodiment of the present invention acquires a media service flow configuration parameter indication, where the media service flow configuration parameter indication includes at least one of the following: a data packet sequence number, a current connection status, media information, and media play time; and sends the acquired media service flow configuration parameter indication to a RAN, so that the RAN can estimate a terminal status according to the media service flow configuration parameter indication, and perform wireless scheduling according to the terminal status to select a better service and a better scheduling scheme for a terminal user, so as to finally achieve an effect of optimizing experience for a media service.

Figure 5:
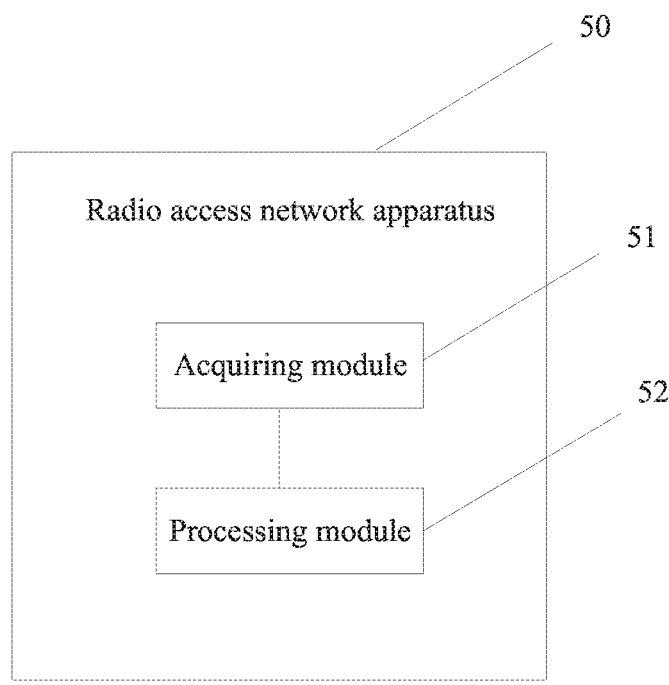
FIG. 5 is a structural block diagram of an apparatus for acquiring a media service parameter indication according to an embodiment of the present invention.

Accordingly, an embodiment of the present invention further provides a radio access network apparatus. Referring to FIG. 5, FIG. 5 is a structural block diagram of a radio access network apparatus 50 according to the embodiment of the present invention. The apparatus 50 includes:

an acquiring module 51, configured to acquire a media service flow configuration parameter indication, where the media service flow configuration parameter indication includes at least one of the following: a data packet sequence number, a current connection status, media information, and media play time; and a processing module 52, configured to estimate a terminal status according to the media service flow configuration parameter indication acquired by the acquiring module 51.

The acquiring module 51 may be configured to:

receive a data packet or control signaling that carries the media service flow configuration parameter indication; and acquire the media service flow configuration parameter indication according to the received data packet or control signaling.

When the media service flow configuration parameter indication is carried in the control signaling, the media service flow configuration parameter indication may include at least one of the following: a current connection status and media information.

When the media service flow configuration parameter indication is carried in the data packet, the data packet may be a GTP-U data packet, and the media service flow configuration parameter indication may be located in an extension header of the GTP-U data packet; and the acquiring module 51 may be configured to:

acquire the media service flow configuration parameter indication by parsing the extension header of the GTP-U data packet.

The apparatus for acquiring a media service parameter indication provided in this embodiment of the present invention acquires a media service flow configuration parameter indication, where the media service flow configuration parameter indication includes at least one of the following: a data packet sequence number, a current connection status, media information, and media play time; and sends the acquired media service flow configuration parameter indication to a RAN, so that the RAN can estimate a terminal status according to the media service flow configuration parameter indication, and perform wireless scheduling according to the terminal status to select a better service and a better scheduling scheme for a terminal user, so as to finally achieve an effect of optimizing experience for a media service.

Figure 6:
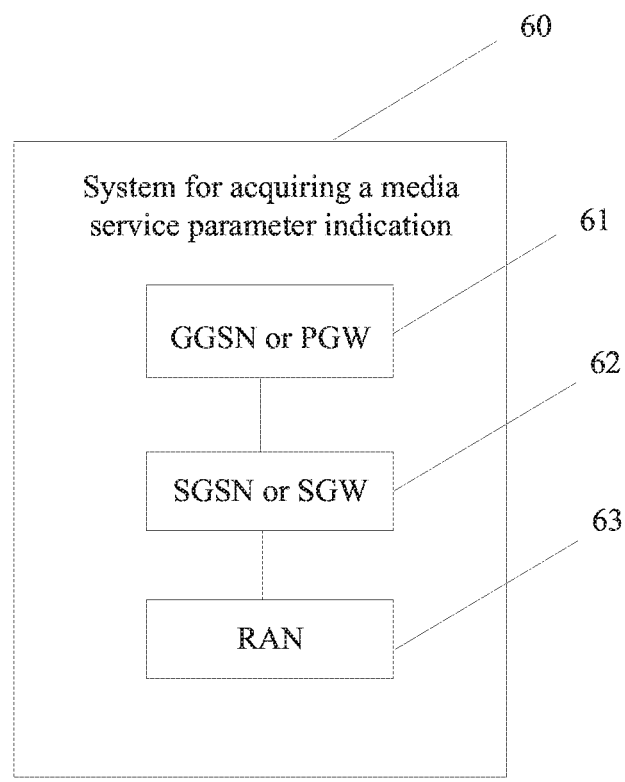
FIG. 6 is a structural block diagram of a system for acquiring a media service parameter indication according to an embodiment of the present invention.

Accordingly, an embodiment of the present invention further provides a system for acquiring a media service parameter indication. Referring to FIG. 6, FIG. 6 is a structural block diagram of a system 60 for acquiring a media service parameter indication according to an embodiment of the present invention. The system 60 includes: a GGSN or PGW 61, an SGSN or SGW 62, and a RAN 63.

The GGSN or PGW 61 is configured to acquire a media service flow configuration parameter indication, where the media service flow configuration parameter indication includes at least one of the following: a data packet sequence number, a current connection status, media information, and media play time.

The GGSN or PGW 61 is further configured to send the media service flow configuration parameter indication to the SGSN or SGW 62.

The SGSN or SGW 62 is configured to: acquire the media service flow configuration parameter indication sent by the GGSN or PGW 61, and send the media service flow configuration parameter indication to the RAN 63.

The RAN 63 is configured to acquire the media service flow configuration parameter indication.

Further, the system may further include a packet inspection apparatus.

The packet inspection apparatus is configured to: before the GGSN or PGW 61 acquires the media service flow configuration parameter indication, perform packet inspection on a media service data packet to acquire the media service flow configuration parameter indication.

The packet inspection apparatus is further configured to send the media service flow configuration parameter indication to the GGSN or PGW 61.

The GGSN or PGW 61 may be configured to receive the media service flow configuration parameter indication from the packet inspection apparatus.

In an embodiment of the present invention, the media service flow configuration parameter indication may be carried in a data packet. In this case, the GGSN or the PGW may be configured to: send a data packet that carries the media service flow configuration parameter indication to the SGSN or the SGW. The SGSN or the SGW may be configured to send a data packet that carries the media service flow configuration parameter indication to the RAN.

In another embodiment of the present invention, the media service flow configuration parameter indication may be carried in control signaling. In this case, the SGSN or SGW 62 may be configured to: send control signaling that carries the media service flow configuration parameter indication to an MME, so that the MME sends the control signaling to the RAN.

In still another embodiment of the present invention, the media service flow configuration parameter indication is carried in a data packet and control signaling. In this case, the GGSN or the PGW may be configured to: add the media service flow configuration parameter indication to a data packet and control signaling that are to be sent to the SGSN or the SGW.

The SGSN or SGW 62 may be configured to:

add the media service flow configuration parameter indication to a data packet that is to be sent to the RAN; or send control signaling that carries the media service flow configuration parameter indication to an MME, so that the MME sends the control signaling to the RAN.

In the system for acquiring a media service parameter indication provided in this embodiment of the present invention, when the media service flow configuration parameter indication is carried in the data packet, the data packet is a GTP-U data packet, and the media service flow configuration parameter indication may be located in an extension header of the GTP-U data packet.

The system for acquiring a media service parameter indication provided in this embodiment of the present invention acquires a media service flow configuration parameter indication, where the media service flow configuration parameter indication includes at least one of the following: a data packet sequence number, a current connection status, media information, and media play time; and sends the acquired media service flow configuration parameter indication to a RAN, so that the RAN can estimate a terminal status according to the media service flow configuration parameter indication, and perform wireless scheduling according to the terminal status to select a better service and a better scheduling scheme for a terminal user, so as to finally achieve an effect of optimizing experience for a media service.

It should be noted that in the apparatus for acquiring a media service parameter indication according to the foregoing embodiment, the division of the foregoing functional modules is used as an example only. In an actual application, the foregoing function allocation can be completed by different functional modules according to a requirement, that is, the internal structure of the apparatus is divided into different functional modules to complete all or some of the foregoing functions. In addition, the apparatus for acquiring a media service parameter indication provided in the foregoing embodiment is based on a same concept as the embodiments of the method for acquiring a media service parameter indication. For specific implementation processes thereof, refer to the method embodiments, and details are not described repeatedly herein.

A person of ordinary skill in the art may understand that all or some of the steps of the embodiments may be implemented by hardware or a program instructing related hardware. The program may be stored in a computer readable storage medium. The storage medium may include: a read-only memory, a magnetic disk, an optical disc, or the like.

The foregoing descriptions are merely exemplary embodiments of the present invention, but are not intended to limit the present invention. Any modification, equivalent replacement, and improvement made without departing from the spirit and principle of the present invention shall fall within the protection scope of the present invention.

What is claimed is:

1. A method for acquiring a media service parameter indication, the method comprising:
   performing, by a packet inspection apparatus, packet inspection on a media service data packet to acquire a media service flow configuration parameter indication;
   sending, by the packet inspection apparatus, a media service flow configuration parameter indication to a gateway General Packet Radio Service (GPRS) support node (GGSN) or a package data network gateway (PGW), wherein the media service flow configuration parameter indication comprises at least one of the following: a data packet sequence number, a current connection status, media information, or a media play time;
   receiving, by the GGSN or the PGW, the media service flow configuration parameter indication from the packet inspection apparatus;
   sending, by the GGSN or the PGW, the media service flow configuration parameter indication to a serving GPRS support node (SGSN) or a serving gateway (SGW);
   sending, by the SGSN or the SGW, the media service flow configuration parameter indication to a radio access network (RAN);
   acquiring, by the RAN, the media service flow configuration parameter indication;
   estimating, by the RAN, a terminal status according to the media service flow configuration parameter indication; and
   performing wireless scheduling according to the terminal status.

2. The method according to claim 1, wherein the media service flow configuration parameter indication is carried in a data packet, wherein sending, by the GGSN or the PGW, the media service flow configuration parameter indication to the SGSN or the SGW comprises adding, by the GGSN or the PGW, the media service flow configuration parameter indication to the data packet that is to be sent to the SGSN or the SGW, and wherein sending, by the SGSN or the SGW, the media service flow configuration parameter indication to a RAN comprises adding, by the SGSN or the SGW, the media service flow configuration parameter indication to the data packet that is to be sent to the RAN.

3. The method according to claim 2, wherein when the media service flow configuration parameter indication is carried in the data packet, the data packet is a GPRS Tunneling Protocol-User Plane (GTP-U) data packet, and wherein the media service flow configuration parameter indication is located in an extension header of the GTP-U data packet.

4. The method according to claim 1, wherein the media service flow configuration parameter indication is carried in control signaling, wherein sending, by the GGSN or the PGW, the media service flow configuration parameter indication to an SGSN or an SGW comprises adding, by the GGSN or the PGW, the media service flow configuration parameter indication to control signaling that is to be sent to the SGSN or the SGW, and wherein sending, by the SGSN or the SGW, the media service flow configuration parameter indication to the RAN comprises sending, by the SGSN or the SGW, control signaling that carries the media service flow configuration parameter indication to a mobility management entity MME and sending, by the MME, the control signaling to the RAN.

5. The method according to claim 1, wherein the media service flow configuration parameter indication is carried in a data packet and control signaling,
   wherein sending, by the GGSN or the PGW, the media service flow configuration parameter indication to the SGSN or the SGW comprises adding, by the GGSN or the PGW, the media service flow configuration parameter indication to the data packet and the control signaling that are to be sent to the SGSN or the SGW; and
   wherein sending, by the SGSN or the SGW, the media service flow configuration parameter indication to the RAN comprises adding, by the SGSN or the SGW, the media service flow configuration parameter indication to the data packet that is to be sent to the RAN or sending, by the SGSN or the SGW, the control signaling that carries the media service flow configuration parameter indication to an MME and sending, by the MME, the control signaling to the RAN.

6. A method for acquiring a media service parameter indication, the method comprising:
   acquiring, by a gateway General Packet Radio Service (GPRS) support node (GGSN) or a packet data network gateway (PGW), a media service flow configuration parameter indication, wherein the media service flow configuration parameter indication comprises at least one of the following: a data packet sequence number, a current connection status, media information, or media play time, wherein the media service flow configuration parameter indication is acquired by a packet inspection apparatus, and wherein the packet inspection apparatus performs packet inspection on a media service data packet to obtain the media service flow configuration parameter indication; and sending, by the GGSN or the PGW, the media service flow configuration parameter indication to a radio access network (RAN).

7. The method according to claim 6, wherein sending, by the GGSN or the PGW, the media service flow configuration parameter indication to the RAN comprises adding, by the GGSN or the PGW, the media service flow configuration parameter indication to the data packet or a control signaling that is to be sent to the RAN, and wherein, when the media service flow configuration parameter indication is carried in the control signaling, the media service flow configuration parameter indication comprises at least one of the following: a current connection status or media information.

8. The method according to claim 6, wherein, when the media service flow configuration parameter indication is carried in the data packet, the data packet is a GPRS Tunneling Protocol-User Plane (GTP-U) data packet, and wherein the media service flow configuration parameter indication is carried in an extension header of the GTP-U data packet.

9. A method for acquiring a media service parameter indication, the method comprising:
  acquiring, by a radio access network (RAN), a media service flow configuration parameter indication, wherein the media service flow configuration parameter indication comprises at least one of the following: a data packet sequence number, a current connection status, media information, or media play time, wherein the media service flow configuration parameter indication is acquired by a packet inspection apparatus, and wherein the packet inspection apparatus performs packet inspection on a media service data packet to obtain the media service flow configuration parameter indication;
  estimating, by the RAN, a terminal status according to the acquired media service flow configuration parameter indication; and
  performing wireless scheduling according to the terminal status.

10. The method according to claim 9, wherein acquiring, by the RAN, the media service flow configuration parameter indication comprises:
  receiving, by the RAN, the data packet or control signaling that carries the media service flow configuration parameter indication; and
  acquiring, by the RAN, the media service flow configuration parameter indication according to the received data packet or control signaling,
  wherein, when the media service flow configuration parameter indication is carried in the control signaling, the media service flow configuration parameter indication comprises at least one of the following: the current connection status or the media information.

11. The method according to claim 10, wherein, when the media service flow configuration parameter indication is carried in the data packet, the data packet is a GPRS Tunneling Protocol-User Plane (GTP-U) data packet, wherein the media service flow configuration parameter indication is located in an extension header of the GTP-U data packet, and wherein acquiring the media service flow configuration parameter indication according to the data packet comprises acquiring the media service flow configuration parameter indication by parsing the extension header of the GTP-U data packet.

12. A system for acquiring a media service parameter indication,
  wherein the system comprises a gateway General Packet Radio Service (GPRS) support node (GGSN) or a packet data network gateway (PGW), a serving GPRS support node (SGSN) or a serving gateway (SGW), and a radio access network (RAN),
  wherein the GGSN or the PGW is configured to acquire a media service flow configuration parameter indication, wherein the media service flow configuration parameter indication comprises at least one of the following: a data packet sequence number, a current connection status, media information, or media play time,
  wherein the GGSN or the PGW is further configured to send the media service flow configuration parameter indication to the SGSN or the SGW,
  wherein the SGSN or the SGW is configured to acquire the media service flow configuration parameter indication sent by the GGSN or the PGW, and send the media service flow configuration parameter indication to the RAN,
  wherein the system further comprises a packet inspection apparatus, wherein the packet inspection apparatus is configured to, before the GGSN or the PGW acquires the media service flow configuration parameter indication, perform packet inspection on a media service data packet to acquire the media service flow configuration parameter indication,
  wherein the packet inspection apparatus is configured to send the media service flow configuration parameter indication to the GGSN or the PGW,
  wherein the GGSN or the PGW is configured to receive the media service flow configuration parameter indication from the packet inspection apparatus, and
  wherein the RAN is configured to acquire the media service flow configuration parameter indication, estimate a terminal status according to the media service flow configuration parameter indication and perform wireless scheduling according to the terminal status.

13. The system according to claim 12, wherein the media service flow configuration parameter indication is carried in a data packet,
  wherein the GGSN or the PGW is configured to send the data packet that carries the media service flow configuration parameter indication to the SGSN or the SGW, and
  wherein the SGSN or the SGW is configured to send the data packet that carries the media service flow configuration parameter indication to the RAN.

14. The system according to claim 13, wherein, when the media service flow configuration parameter indication is carried in the data packet, the data packet is a GPRS Tunneling Protocol-User Plane (GTP-U) data packet, and wherein the media service flow configuration parameter indication is located in an extension header of the GTP-U data packet.

15. The system according to claim 12, wherein the media service flow configuration parameter indication is carried in control signaling, and wherein the SGSN or the SGW is configured to send control signaling that carries the media service flow configuration parameter indication to a mobility management entity (MME) so that the MME sends the control signaling to the RAN.

16. The system according to claim 12, wherein the media service flow configuration parameter indication is carried in a data packet and control signaling, wherein the GGSN or the PGW is configured to add the media service flow configuration parameter indication to the data packet and the control signaling that are to be sent to the SGSN or the SGW, and wherein the SGSN or the SGW is configured to add the media service flow configuration parameter indication to the data packet that is to be sent to the RAN or to send control signaling that carries the media service flow configuration parameter indication to an MME so that the MME sends the control signaling to the RAN.

17. An apparatus for acquiring a media service parameter indication, the apparatus comprising:

a receiver configured to acquire a media service flow configuration parameter indication, wherein the media service flow configuration parameter indication comprises at least one of the following: a data packet sequence number, a current connection status, media information, or media play time, wherein the media service flow configuration parameter indication is acquired by a packet inspection apparatus, and wherein the packet inspection apparatus performs packet inspection on a media service data packet to obtain the media service flow configuration parameter indication; and a transmitter configured to send the media service flow configuration parameter indication acquired by the receiver to a radio access network (RAN).

18. The apparatus according to claim 17, wherein the transmitter is configured to add the media service flow configuration parameter indication to the data packet or control signaling that is to be sent to the RAN, and wherein when the media service flow configuration parameter indication is carried in the control signaling, the media service flow configuration parameter indication comprises at least one of the following: the current connection status or the media information.

19. The apparatus according to claim 17, wherein, when the media service flow configuration parameter indication is carried in the data packet, the data packet is a GPRS Tunneling Protocol-User Plane (GTP-U) data packet, and wherein the media service flow configuration parameter indication is carried in an extension header of the GTP-U data packet.

* * * * *